(12) United States Patent
Grieger et al.

(10) Patent No.: US 11,218,230 B2
(45) Date of Patent: Jan. 4, 2022

(54) CALIBRATION SYSTEM, ANTENNA SYSTEM AND CALIBRATION METHOD

(71) Applicant: XILINX, INC., San Jose, CA (US)

(72) Inventors: Michael Grieger, Dresden (DE); Alexandros Pollakis, Dresden (DE); Volker Aue, Dresden (DE); Jan Dohl, Dresden (DE); Ulrich Walther, Dresden (DE)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 17/252,686

(22) PCT Filed: Jun. 12, 2019

(86) PCT No.: PCT/EP2019/065384
§ 371 (c)(1),
(2) Date: Dec. 15, 2020

(87) PCT Pub. No.: WO2019/243139
PCT Pub. Date: Dec. 26, 2019

(65) Prior Publication Data
US 2021/0281335 A1 Sep. 9, 2021

(30) Foreign Application Priority Data
Jun. 18, 2018 (EP) ..................... 8178177

(51) Int. Cl.
*H04B 17/18* (2015.01)
*H04B 17/12* (2015.01)

(52) U.S. Cl.
CPC ............ *H04B 17/18* (2015.01); *H04B 17/12* (2015.01)

(58) Field of Classification Search
CPC ................................ H04B 17/18; H04B 17/12
See application file for complete search history.

(56) References Cited

U.S. PATENT DOCUMENTS

| 5,696,485 A | * | 12/1997 | Treharne | ................. | B60R 25/00 |
| | | | | | 307/10.4 |
| 7,006,824 B1 | * | 2/2006 | Tse | ........................ | H04B 1/40 |
| | | | | | 375/219 |

(Continued)

FOREIGN PATENT DOCUMENTS

EP 2040333 A1 3/2009

OTHER PUBLICATIONS

Kladovscikov, Leonid etal, "Review of Self Tuning Methods for Direct Conversion Transceivers", 2017 Open Conference of Electrical, Electronic and Information Sciences (ESTREAM), IEEE, Apr. 27, 2017, pp. 1-6, XP033259680, DOI: 10.1109/ESTREAM. 2017.7950308; abstract left-hand column—p. 3.

(Continued)

*Primary Examiner* — Dominic E Rego
(74) *Attorney, Agent, or Firm* — Patterson + Sheridan, LLP (57) ABSTRACT

A calibration system for calibrating a number of transceivers, each comprising an in-phase signal path and a quadrature signal path in receive direction and/or in transmit direction is disclosed herein. The calibration system includes a calibration signal generator that is configured to generate a predefined calibration signal for every one of the transceivers, a calibration transceiver that is coupled to the calibration signal generator and to the transceivers and that is configured to supply the generated predefined calibration signals each to the respective transceiver during operation of the transceivers, and/or that is configured to receive the predefined calibration signals after they travel through each one of the transceivers during operation of the transceivers, and a calibration unit that is configured to calibrate the in-phase signal paths and the quadrature signal paths of the transceivers during operation of the transceivers based on the calibration signals as they are received by the transceiv- (Continued)

ers or based on the calibration signals as they are received by the calibration transceiver. Further, an antenna system and a calibration method are also described.

20 Claims, 6 Drawing Sheets (56) References Cited

U.S. PATENT DOCUMENTS

| | | | | |
|---|---|---|---|---|
| 7,463,866 | B1* | 12/2008 | Chen | H04B 1/0475 |
| | | | | 375/296 |
| 7,715,836 | B2* | 5/2010 | Vassiliou | H04B 17/14 |
| | | | | 455/423 |
| 9,621,312 | B2* | 4/2017 | Li | H04L 5/001 |
| 2005/0156662 | A1* | 7/2005 | Raghupathy | H03F 1/3282 |
| | | | | 330/10 |
| 2007/0291883 | A1* | 12/2007 | Welz | H04B 1/30 |
| | | | | 375/350 |
| 2009/0227214 | A1* | 9/2009 | Georgantas | H04B 17/20 |
| | | | | 455/86 |
| 2013/0210375 | A1* | 8/2013 | Dufrene | H04B 1/525 |
| | | | | 455/79 |
| 2013/0260844 | A1 | 10/2013 | Rucki et al. | |
| 2013/0336376 | A1* | 12/2013 | Do | H04B 17/13 |
| | | | | 375/227 |
| 2015/0118970 | A1* | 4/2015 | Thoukydides | H04B 17/21 |
| | | | | 455/67.14 |
| 2016/0248468 | A1* | 8/2016 | Greiner | H04W 4/80 |
| 2017/0358950 | A1* | 12/2017 | Zeine | H02J 50/10 |
| 2019/0007094 | A1* | 1/2019 | Goichberg | H04B 3/06 |
| 2019/0200270 | A1* | 6/2019 | Yu | H04W 36/30 |

OTHER PUBLICATIONS

International Search Report and Written Opinion for PCT/EP2019/065384 (11pages).

* cited by examiner

CALIBRATION SYSTEM, ANTENNA SYSTEM AND CALIBRATION METHOD

TECHNICAL FIELD

The invention relates to a calibration system. Further, the present invention relates to an antenna system and to a calibration method.

BACKGROUND

Although applicable to any wireless communication system, the present invention will mainly be described in conjunction with the $5^{th}$ generation of wireless communication networks, also referred to as 5G-Networks.

Today wireless communication networks are widely used for providing voice and data communication to users. Such wireless communication networks, like e.g. LTE based or so called 4G networks, usually comprise a core network and a so called radio access network or RAN. It is understood, that each of these interrelated networks may comprise a plurality of different elements, modules or units that together provide the required communication capabilities.

As part of the RAN so called eNodeBs or base stations provide the link between the operators network and the users mobile devices or user equipments (UEs). Usually the eNodeBs will comprise antennas that serve for transmitting outgoing signals to the UEs and for receiving incoming signals from the UEs. Up to now, most commonly passive or active antennas with fixed radiation patterns are used.

However, in modern 5G-Networks such conventional antennas may be replaced by massive MIMO antennas (antennas with a plurality of single antenna elements that may form and steer a plurality of beams at the same time). In such massive MIMO antennas a single transceiver, e.g. a combination of a transmitter and a receiver, is usually required for every antenna element.

Most modern digital modems use baseband signal processing to calculate a modulation waveform to be transmitted and to retrieve the data from a received waveform. It is the task of the single transceivers to up-convert a transmit signal from baseband to radio frequency, and to down-convert a signal from radio frequency to baseband.

As indicated above, with the rise of massive MIMO antennas, the amount of transceivers used at the network side (in the base station antennas) increases drastically. Therefore, simple direct-conversion transceivers are usually used in such massive MIMO antennas, instead of e.g. complex and costly super-heterodyne transceivers used in former radio equipment such as remote radio head (RRH) which typically do not contain more than 8 transceivers.

However, the use of direct-conversion transceivers introduces the need for continuous RF re-calibration while the antennas are in operational mode. This kind of re-calibration is therefore performed while the antennas are in use.

Accordingly, there is a need for an antenna calibration that does not affect signal quality of the primary signals of the wireless transmission system.

SUMMARY OF THE INVENTION

The above stated problem is solved by the features of the independent claims. It is understood, that independent claims of a claim category may be formed in analogy to the dependent claims of another claim category.

Accordingly, it is provided:

A calibration system for calibrating a number, i.e. one or more, of transceivers, each comprising an in-phase signal path and a quadrature signal path in receive direction and/or in transmit direction, the calibration system comprising a calibration signal generator that is configured to generate a predefined calibration signal for every one of the transceivers, a calibration transceiver that is coupled to the calibration signal generator and to the transceivers and that is configured supply the generated calibration signals each to the respective transceiver during operation of the transceivers, and/or that is configured to receive the predefined calibration signals each from one of the transceivers during operation of the transceivers, and a calibration unit that is configured to calibrate the in-phase signal paths and the quadrature signal paths of the transceivers during operation of the transceivers based on the calibration signals as they are received by the transceivers or based on the calibration signals as they are received by the calibration transceiver.

Further, it is provided:

An antenna system comprising a plurality of antenna elements, a transceiver for every one of the antenna elements that is coupled to the respective antenna element, and a calibration system according to the present invention.

Further, it is provided:

A calibration method for calibrating a number of transceivers, each comprising an in-phase signal path and a quadrature signal path in receive direction and/or in transmit direction, the calibration method comprising generating a predefined calibration signal for every one of the transceivers, supplying the generated calibration signals each to the respective transceiver during operation of the transceivers via a calibration transceiver or receiving the predefined calibration signals each from the respective one of the transceivers during operation of the transceivers in the calibration transceiver, and calibrating the in-phase signal paths and the quadrature signal paths of the transceivers during operation of the transceivers based on the calibration signals as they are received by the transceivers or based on the calibration signals as they are received by the calibration transceiver.

The present invention is based on the finding that the direct-conversion transceivers used in modern massive MIMO antennas may comprise a plurality of different digital and/or analog signal processing elements that may comprise tolerances and temperature dependent characteristics. Further, such direct-conversion transceivers usually do not comprise built in calibration or compensation mechanisms, which allow the calibration while the transceiver is actively used for data transmission at the same time.

In the context of the present invention, the term transceiver may refer to any type of device that comprises a transmitter and/or a receiver for RF signals. Such devices may especially comprise a digital IQ-interface.

An exemplary direct-conversion transceiver may consist of a receiver and a transmitter. The transceiver may also contain the analog-to-digital converters (ADCs) and digital-to-analog converters (DACs) to provide a digital interface towards a baseband processor, e.g. an IQ-interface. The baseband processor may therefore provide an in-phase signal (I-signal) and a quadrature signal (Q-signal) to the transmitter. After converting the digital IQ-signals to analog signal, the transmitter first low-pass filters the analog signals to filter out aliases that come out of DACs. Then, the in-phase component is multiplied by a sinusoidal waveform that comes from a local transmitter RF oscillator. The analog Q-signal is multiplied by a 90 degree shifted version of the sinusoidal waveform. The multiplied in-phase and quadrature components are then added to form the RF transmit signal. This signal may then be provided e.g. via an amplifier and a RF output to an antenna element.

The RF receiver may work in a similar but reverse order fashion. A direct-conversion transceiver may e.g. employ a low noise amplifier (LNA) at the first input stage of the receiver. The LNA amplifies the RF signal presented by an antenna element at the input of the receiver. The amplified signal is split into two identical signals. The first split signal is multiplied by a sinusoidal waveform that comes from a local receiver RF oscillator (RX LO). The multiplied signal is the so-called in-phase component (I-component) of the received signal. The second split signal is multiplied by a 90 degree shifted version of the sinusoidal waveform to form the quadrature component (Q-component) of the received signal. Both, in-phase and quadrature components are low pass filtered to filter out any unwanted components of the received signal to avoid distortion through aliasing when sampling the signal. Finally, the filtered in-phase and quadrature components are sampled and analog-to-digital converted to form the digital baseband signal, i.e. the received I-signal and Q-signal.

Since analog components are used in direct-conversion transceivers, a practical direct conversion transceiver is not ideal. Possible causes of the differences of identical components may include device variation in fabrication, frequency, bandwidth, temperature and aging effects. It is understood, that static factors of device variations can be factory-calibrated. The IQ imbalance introduced by dynamic factors, e.g. by frequency or temperature, however require a continuous re-calibration during run-time.

In particular, the signal paths for the in-phase component and the quadrature components can slightly differ in gain. They also may exhibit a slightly different transfer function. Whereas the difference of the transfer function in the in-phase and quadrature components is not significant and can often be neglected, the gain difference is an important factor. The gain difference is also referred to as amplitude mismatch. Likewise, the phase shift between the mixing waveforms may deviate from the exact 90 degrees causing the in-phase and quadrature component to be not 100% orthogonal. This impairment is typically referred to as phase imbalance. Amplitude mismatch and phase imbalance are both nonlinear effects that degrade the performance of a modem in both transmit and receive directions. Both imbalances together are often referred to as IQ imbalances.

As a result of IQ imbalances, the spectrum on the upper side of the carrier interferes with the spectrum on the lower side of the carrier and vice versa. In case the low-pass signal is single sided, IQ imbalances cause an image on the opposite side of the carrier. For OFDM, IQ imbalances introduce inter-carrier interference from the mirroring sub-carrier To improve the performance of transceivers and antennas, especially direct conversion transceivers and massive MIMO antennas using such transceivers, the present invention provides the calibration system that helps minimizing the IQ imbalances. It is understood, that although the calibration system is described in combination with transceivers, it may also be used with dedicated transmitters and receivers.

The calibration system comprises the calibration signal generator that generates calibration signals for the single transceivers. The calibration signals will be provided to the transceivers during normal operation of the transceivers. Therefore, the calibration signal generator may generate calibration signals that do not interfere with the operational signals in the transceivers. This may e.g. be achieved by selecting respective signal frequencies or by providing the calibration signals with a signal amplitude or level that is below the noise level in the transceiver system. How such signals may be used for calibration of the transceivers will be explained in detail below.

It is understood, that the calibration signal generator may generate a dedicated calibration signal for every transceiver. This may allow parallel testing of a plurality of transceivers. However, it is also possible for the calibration signal generator to generate the same calibration signal for the transceivers. This allows sequentially testing the single transceivers.

Depending on whether a transceiver is tested in transmit or receive direction, the calibration signal may be provided to the transmitter or the receiver of the respective transceiver. If the signal is provided to the receiver of the transceiver, the calibration transceiver may emit the respective calibration signal to the respective transceiver. If the signal is provided to the transmitter of the transceiver, the calibration receiver may receive the calibration signal from the transceiver. In this case, the calibration signal generator may be coupled to the input side of the transmitter of the transceiver or to any element in the signal chain of the transmitter that may serve to couple in the calibration signal.

Since transceivers usually do not comprise an RF loopback, an external loop and a calibration transceiver dedicated to calibration are provided by the present invention. A transceiver may have the option for an RF loopback which is an alternate path. However, this usually means that the output of that transceiver is switched off. To ensure that only the IQ imbalance of one single RX or TX chain is measured and not that of the whole calibration chain, the calibration transceiver may be provided free of IQ imbalances. Because the calibration transceiver may be switched into a loopback mode (either on chip or externally), a conventional calibration signal such as a single tone calibration scheme may be used for measurement and calibration of the calibration transmitter, e.g. periodically. An image rejection ratio of over 50 dB can be achieved by using the single tone scheme.

The calibration unit may therefore analyze either the calibration signals as they are received by the respective transceivers from the calibration transceiver or the calibration signals as they are received by the calibration transceiver from the respective transceivers.

In order to analyze the calibration signals, the calibration unit may comprise respective signal processing elements, like e.g. filters, correlators or the like, that allow the calibration unit to process the calibration signals in the total signals provided by the respective transceivers or by the calibration transceiver, i.e. the calibration signals plus the operational signals received by the respective transceivers.

If the receiver of a transceiver is tested, the calibration unit may e.g. receive the I-signal and the Q-signal from the respective transceiver. In contrast, if the transmitter of the transceiver is tested, the calibration unit may e.g. receive the I-signal and the Q-signal from the calibration transceiver.

The calibration unit may e.g. compare the original calibration signal and the calibration signal as it is provided in the respective I- and Q-signals and determine the necessary calibration. As explained above, the IQ imbalance phenomenon is mainly caused by none–90° phase shifts and amplitude mismatches between the I- and the Q-signal path of the respective transmitter or receiver. The calibration unit may therefore determine the required adaption of the amplitudes and a required phase-shift in in the respective I- and Q-signal paths.

The calibration unit may e.g. compensate the IQ imbalance using dedicated blocks, like e.g. a gain corrector (e.g. an amplifier or attenuator) and a phase shifter. These blocks may e.g. be placed in the in-phase and the quadrature signal paths accordingly. In addition or as alternative the calibration unit may also use a digital pre-compensation of the digital IQ signals in the base band processor. A digital phase shift may e.g. be performed by modifying the timing between the I-signal and Q-signal, i.e. by delaying either one of the I-signal and the Q-signal.

With the above described solution for calibrating transceivers during operation, the present invention allows using simple direct-conversion transceivers or respective transmitters and receivers in massive MIMO antennas. Such massive MIMO antennas may be calibrated with the help of the present invention without shutting down the antenna or interrupting the operation of the antenna for calibration.

Further embodiments of the present invention are subject of the further subclaims and of the following description, referring to the drawings.

In an embodiment, each calibration signal may comprise two orthogonal signals or two quasi-orthogonal signals.

The calibration signals may e.g. be provided as complex calibration signals comprising two signals. One signal may form the real part of the complex calibration signal and the other signal may form the complex part of the calibration signal. The real part may refer to the I-signal and the complex part to the Q-signal. Such a calibration signal may e.g. be expressed as p[n]=pI[n]+jpQ[n]. In such a signal pI[n] may refer to the I-signal in the respective receiver or transmitter. The pQ[n] signal may be a signal that refers to the Q-signal in the respective receiver or transmitter. The pI[n] signal and the pQ[n] signals may be orthogonal or quasi-orthogonal signals. The index value [n] indicates that the signals may be provided as discrete series of signal values.

The main characteristic of orthogonal signals is that they are mutually independent. This means that orthogonal signals may be transmitted simultaneously and may still be separated on the receiving side. Therefore, by using orthogonal signals for the calibration signals, it is possible to provide signals to the signal path that processes the I-signal and the signal path that processes the Q-signal at the same time.

The orthogonal signals may be distinguished from each other by a unique signature.

The unique signature may e.g. comprise:
The period, when the signal is sent.
The frequency on which the signal is sent,
The PN-code in case the calibration signal uses pseudo-noise signals
In a more generic sense: by its waveform
In case of the PN-code: by its pseudo random binary sequence.

A signature may in general be any property of the signals that allows distinguishing a signal from other signals. A signature can e.g. be anything starting from a modulated binary sequence that is distinguished through the different binary sequences to signals that are unique with respect to their time or spectral characteristics.

In another embodiment, each calibration signal may comprises two pseudo noise signals, also called PN-sequences or PN-signals, especially band-limited pseudo noise signals, and more especially modulated pseudo-random binary sequences, also called PRBS. A special type pf PRBS that may be used is the so called Gold code, named after Robert Gold.

In analogy to the above, the calibration signals may be provided as complex calibration signals comprising a pseudo noise signal that forms the real part of the complex calibration system and a pseudo noise signal that forms the complex part of the calibration signal. The real part pseudo noise signal refers to the I-signal and the complex part pseudo noise signal refers to the Q-signal.

The calibration signal generator may generate the PN-sequences. For calibrating a transceiver, the PN-sequences may be IQ modulated and filtered to the bandwidth of the operational signal. The resulting signal may then be provided to the respective transceiver from the calibration transceiver. The received calibration signal will be impaired by noise but also, in operational state, by the operational signal (e.g. LTE signals that will be superimposed with the calibration signal in practice.).

Using the above mentioned PN-sequences allows introducing the PN-sequences into the operational signal of the transceivers with a signal level that is below the noise level in the respective system. Therefore, the operation of the system will not be influenced by the presence of the PN-sequences based calibration signals.

The evaluation of the calibration signals may then e.g. be performed using correlators as will be described in further detail below.

In a further embodiment, the calibration signals may comprise equal autocorrelation and zero cross-correlation.

It is understood, that the above terms "equal" and "zero" may also refer to non-ideal calibration signals that comprise an almost equal autocorrelation and that comprise a cross-correlation that is as low as possible.

The phase and amplitude imbalance in reception direction (RX) for a transceiver may be mathematically modelled as:

$$x_{LP} = x_{RF}(t)x_{LO}(t) \qquad (1)$$

$$= \underbrace{\alpha_R(x_I(t) + jx_Q(t))}_{x_L(t)} + \underbrace{\beta_R(x_I(t) - jx_Q(t))}_{x_L^*(t)}$$

$$= (\alpha_R + \beta_R)x_I(t) + j(\alpha_R - \beta_R)x_Q(t)$$

where:

$$\alpha_R = \cos(\phi_R) - j\epsilon_R \sin(\phi_R) \qquad (2)$$

$$\beta_R = \epsilon_R \cos(\phi_R) + j \sin(\phi_R) \qquad (3)$$

Where $X_{RF}$ is the incoming RF signal, $X_{LO}$ is the signal generated by the local oscillator, $\epsilon_R$ refers to the amplitude error of the in-phase signal path and the quadrature signal path, $\phi_R$ refers to the phase error of the in-phase signal path and the quadrature signal path, $X_I$ is the signal in the in-phase signal path, and $X_Q$ is the signal in the quadrature signal path.

In Equation (1) the effect of IQ imbalance on the low pass signal is derived. The signal $X_L$ is distorted with a scaled version of its complex conjugate. Because of the complex conjugation, the spectrum on the upper side of the carrier interferes with the spectrum on the lower side of the carrier and vice versa. Thus, if the low-pass signal is single sided, IQ imbalance causes an image on the opposite side of the carrier. For OFDM, the interference is limited to mutual interference of two mirroring sub-carriers and the relative amount of interference is easily found.

$$10 \log\left(\frac{|\beta_R|^2}{|\alpha_R|^2}\right) = 10 \log\left(\frac{\epsilon_R^2 + \tan^2(\phi_R)}{1 + \epsilon_R^2 \tan^2(\phi_R)}\right) \quad (4)$$

The phase and amplitude imbalance in transmission direction (TX) for a transceiver may be mathematically modelled analogously.

The present invention may measure the IQ imbalance of a transceiver as will be described below.

In this approach two modulated PN sequences are used in a complex calibration signal to measure IQ imbalance. At the receiver the correlation between a clean (undistorted) PN sequence and the received distorted sequence is calculated. The clean PN sequence may be generated locally at the calibration unit. Thus, it has not to pass any transmitter and receiver and is not affected by IQ imbalance. The resulting correlation value can therefore be used to estimate the amplitude and phase imbalance introduced within the TX and the RX signal chain. The details of this scheme will be explained below.

PN-sequence that serve for the determination of IQ-imbalances according to the present invention have to fulfill certain requirements. These properties are zero mean value (that is e.g. present in balanced Gold codes)
equal auto-correlation
zero cross-correlation with one another.

Especially, using a sequence with non-zero cross-correlation with its conjugate complex results in a systematic offset (error) in the calculation of the correlation and therefore to wrong estimation of the IQ imbalance. A zero mean value is required to ensure that no DC offset is added by the PN sequences. The properties regarding equal auto-correlation and zero cross-correlation with one another are required to ensure that the correlation of the modulated PN sequence with the conjugate received sequence is zero in the ideal case, i.e. when no IQ imbalances and noise are present.

Corresponding PN-sequences may e.g. be searched for in advance, e.g. by a trial and error method. The resulting PN-sequences may then e.g. be stored as the initial states in e.g. a memory of the calibration signal generator. The PN-sequences may comprise any length required and different sequences for the same length may also be stored. In case the IQ imbalance shows frequency variations, band limited PN sequences would be transmitted at different frequency offsets to the carrier. The band limitation would be less than the coherence bandwidth of the variation and multiple such measurements would be taken across the full bandwidth at various frequency offsets to sample the transfer function.

Since variations of the IQ imbalance are slow, the time it takes to take those measurements is not significant and, therefore, the sampling of the transfer function could be narrowed down over time.

In one embodiment, the calibration unit may comprise a non-volatile memory. Measured IQ imbalance values may be stored in this non-volatile memory to improve the default values after system startup and to obtain information on the impact of system aging.

In another embodiment, the calibration system may comprise a coupling element for every transceiver configured to couple in a signal into the respective transceiver and/or couple out a signal out of the respective transceiver.

It is understood, that the coupling elements may either be arranged outside of the transceivers, e.g. between the respective transceiver and the corresponding antenna element or inside of the transceiver. It is further understood, that instead of a single bidirectional coupling element in each case two unidirectional coupling elements may be used, one for coupling in a signal into the respective transceiver and one for coupling out a signal from the transceiver.

Coupling elements in this regard may e.g. comprise directional couplers. Such directional couplers may e.g. be implemented as coupling lines or traces in a circuit of the transceivers or the respective antenna.

In a further embodiment, the calibration unit may comprise a number, i.e. one or more, of correlators, also called correlator banks, that are each configured to correlate signals received by a specific one of the transceivers with the respective predetermined calibration signal and/or that are each configured to correlate signals received by the calibration transceiver with the respective predetermined calibration signal, wherein the calibration unit may be configured to calibrate the respective in-phase signal paths and the quadrature signal paths of the transceivers based on the correlation result.

As indicated above, correlation may be used to analyze the differences between the original calibration signal and the calibration signal after being processed by a transceiver in order to determine the IQ imbalances of the transceiver.

In the IQ imbalance free case the correlation value for the PN sequence x[n] can be calculated as:

$$r_{x,x^*} = \quad (5)$$
$$\text{corr}(x, x^*) = \frac{1}{L}\sum_{n=0}^{L-1}(x[n]x[n]) = \frac{1}{L}\sum_{n=0}^{L-1}(x_I^2[n] - x_Q^2[n] + 2jx_I[n]x_Q[n])$$

with $x[n]=x_I[n]+jx_Q[n]$. In one embodiment, $x_I[n]$ and $x_Q[n]$ are Gold codes that have equal autocorrelation and zeros cross-correlation, hence, the correlation value $r_{x,x^*}$ will be zero, $$r_{x,x^*} = \underbrace{\frac{1}{L}\sum_{n=0}^{L-1}x_I^2[n] - \frac{1}{L}\sum_{n=0}^{L-1}x_Q^2[n]}_{=0} + \underbrace{\frac{2j}{L}\sum_{n=0}^{L-1}x_I[n]x_Q[n]}_{=0} = 0 \quad (6)$$

Considering a PN sequence $\tilde{y}[n]$ being distorted by IQ imbalance, it can be written as $$\tilde{y}[n] = \alpha_R x_I[n] + \beta_R x_Q[n] \quad (7)$$

$$= \cos(\phi_R)(1+\epsilon_R)x_I[n] + j\sin(\phi_R)(1-\epsilon_R)x_I[n] + j\cos(\phi_R)(1-\epsilon_R)x_Q[n] + \sin(\phi_R)(1+\epsilon_R)x_Q[n] \quad (8)$$

The correlation value can be written as $$r_{x,\tilde{y}^*} = \frac{1}{L}\sum_{n=0}^{L-1}(\cos(\phi_R)(1+\epsilon_R)x_I^2[n] - \quad (9)$$
$$\cos(\phi_R)(1-\epsilon_R)x_Q^2[n] + 2\sin(\phi_R)\epsilon_R x_I[n]x_Q[n]) +$$
$$\frac{j}{L}\sum_{n=0}^{L-1}(\sin(\phi_R)(1-\epsilon_R)x_I^2[n] + \sin(\phi_R)(1+\epsilon_R)x_Q^2[n] +$$
$$2\cos(\phi_R)x_I[n]x_Q[n])$$

If the two Gold codes $X_I[n]$ and $X_Q[n]$ have equal auto-correlation $r_{xI,xI}=r_{xQ,xQ}$ and cross-correlation $r_{xI,xQ}$, the correlation value simplifies to:

$$r_{x,\tilde{y}^*}=\cos(\phi_R)(1+\epsilon_R)r_{xIxI}-\cos(\phi_R)(1-\epsilon_R)r_{xIxI}+2\sin(\phi_R) \\ \epsilon_R r_{xIxQ}, j(\sin(\phi_R)(1-\epsilon_R)r_{xIxI}+\sin(\phi_R) \\ (1+\epsilon_R)r_{xIxI}+2\cos(\phi_R)r_{xIxQ}) \quad (10)$$

$$=2r_{xIxI}(\epsilon_R\cos(\phi_R)+j\sin(\phi_R))+2r_{xIxQ}(\epsilon_R\sin(\phi_R)+j\cos(\phi_R)) \quad (11)$$

For $r_{xI,xI} \gg r_{xI,xQ}$ it may be approximated:

$$r_{x,\tilde{y}^*} \approx 2r_{xIxI}(\epsilon_R\cos(\phi_R)+j\sin(\phi_R)) \quad (12)$$

Expanding the expression to first order for small values of $\phi_R$ ($\sin(x) \approx x$ and $\cos(x) \approx 1$ for $x \ll 1$) we obtain a linear dependency between $\epsilon_R$ and $\text{Re}\{r_{x,\tilde{y}^*}\}$, and between $\phi_R$ and $\text{Im}\{r_{x,\tilde{y}^*}\}$ $$r_{x,\tilde{y}^*} \approx 2r_{xIxI}(\epsilon_R+j\phi_R) \quad (13)$$

These dependencies can be exploited to measure the presence and severity of IQ imbalance.

As indicated above, the received calibration signal will be impaired by noise but also, in operational state, by the operational signal (e.g. LTE signals that will be superimposed with the calibration signal in practice.).

The SNR (signal to noise ration) of the correlation result is, therefore, quite low. The length of the PN sequences may therefore be chosen as long as required to achieve the target SNRs required for IQ imbalance compensation. The length of the PN sequence may also need to be adjusted to the present SNR. One solution is the consecutive use of multiple short sequences and to run an iterative calibration algorithm for the estimation of the IQ imbalance.

To precisely estimate the IQ imbalance using PN sequences in the presence of noise, a high SNR of the correlation results is advantageous.

For example in an LTE system, the requirement for the image rejection may e.g. be 43 dB, thus, in this case the SNR of the correlation result has to be larger than 40 dB (e.g. 50 dB). To achieve this target value, the length of the used PN sequence has to be adapted accordingly, e.g. because the transmit power of the calibration signal is fixed. The level of the calibration signal may e.g. be 35 dB below the LTE signal in order not to impact the EVM (error vector magnitude). In an antenna with 8 transmit/receive paths, the calibration signal may be added to only one out of the eight transmit or receive paths, respectively, the calibration signal on that path is allowed to be eight times higher (9 dB). Therefore, the minimum required spreading gain is 66 dB (=35 dB+40 dB-9 dB). Doubling the sequence length $L=2N$ (increasing N by one) increases the SNRr of the correlation by 3 dB. By using a complex PN sequence another 3 dB is gained. Hence, SNRr of the correlation of a complex sequence of length N is:

$$SNR_r = SNR+3(N+1)\text{dB} \quad (14)$$

In an LTE system, considering a spreading gain of 66 dB the required sequence length is $L=2^{21}$. At a sample rate of 15.36 MS/s this would relate to a PN sequence which would require about 137 ms to be transmitted. Instead of transmitting such long sequences, multiple short sequences can be used instead to iteratively estimate the IQ imbalance and set the calibration parameters. E.g. a sequence of length 10 ms would relate to spreading gain of $\approx 54.7$ dB, which could be used for an iterative algorithm. The overall time to achieve the target SNRr of 40 dB and a spreading gain of 66 dB remains.

In a further embodiment, the calibration unit may be configured to determine the imbalances, especially regarding phase and amplitude, between the in-phase signal path and the quadrature signal path in receive direction and/or in transmit direction of a respective transceiver based on a least square regression algorithm.

As described above, estimating the IQ imbalance directly would require a PN sequence that is too long, e.g. of length $L=2^{27.33}$ for a target of SNRr=50 dB. Instead, in this embodiment multiple short sequences are used to run an iterative calibration algorithm. The measured/estimated correlation value directly relates to amplitude and phase imbalance values $\epsilon_R$ and $\phi_R$, see equation (13). These values can be used as parameters for the transceiver to calibrate the IQ imbalance.

The real and imaginary part of the correlation value linearly depend on the IQ imbalance parameters $\epsilon_R$ and $\phi_R$. To estimate and calibrate $\epsilon_R$ and $\phi_R$ an independent ordinary least squares regressions is performed for each parameter. In the following algorithm to calibrate the phase imbalance $\phi_R$ is discussed. The algorithm to calibrate the amplitude imbalance $\epsilon_R$ performs the same way.

The regression model (straight line) is given as $$z[n]=\psi\alpha[n]+z_0+\xi[n] \quad (15)$$

where n is the iteration index, $z[n]=\text{Im}\{r[n]_{x,\tilde{y}^*}\}$ is the imaginary part of the measured correlation value, $\alpha[n]$ is the phase correction value, $\xi[n]$ is the noise realization, $\psi$ and $z_0$ are the slope and intercept of the regression model. The goal is to find the parameters $\psi$ and $z_0$ of the following equation $$z=\psi\alpha+z_0 \quad (16)$$

which is the "best" fit for the data point (measurements), understood as in the least-squares approach.

If the strengths of the calibration signals $x[n]$ and $\tilde{y}[n]$) as well as their correlation properties are known, the slope $\psi$ is constant and can be obtained in advanced. The estimate of the intercept is given as $$\hat{z}_0 = \bar{z}-\psi\bar{\alpha} \quad (17)$$

where $\bar{z}$ and $\bar{\alpha}$ denote sample mean values of z and $\alpha$ respectively. The estimate of the phase correction value to compensates the phase imbalance is given as $$\hat{\alpha}_0 = -\frac{\hat{z}_0}{\psi} = \bar{\alpha} - \frac{\bar{z}}{\psi} \quad (18)$$

Note that the mean squared error of $\widehat{\alpha_0}$ decreases with each iteration and converges to zero if the noise $\xi[n]$ is zero mean and Gaussian distributed. After calculating $\widehat{\alpha_0}$, this value is used as phase correction value for the next iteration, $\alpha[n+1]=\widehat{\alpha_0}$.

The following steps are performed at each iteration n:
1. generate PN sequence, transmit, and calculate correlation value
2. estimate the phase correction value $\alpha$ $\widehat{\alpha_0}$
3. set phase correction value $\alpha[n+1]=\widehat{\alpha_0}$ If the slope $\psi$ is unknown, it has to be estimated within each iteration step. Estimates for the slope and the intercept that minimizes the sum of squared residuals are $$\hat{\psi} = \frac{\sum_{i=1}^{n}(\alpha[i]-\bar{\alpha})(z[i]-\bar{z})}{\sum_{i=1}^{n}(\alpha[i]-\bar{\alpha})^2} = \frac{\text{Cov}[\alpha,z]}{\text{Var}[\alpha]} \quad (19)$$

$$\hat{z}_0 = \bar{z}-\hat{\psi}\bar{\alpha}. \quad (20)$$

The estimate of the phase correction value to compensates the phase imbalance is given as $$\hat{\alpha}_0 = -\frac{\hat{z}_0}{\hat{\psi}} = \overline{\alpha} - \frac{\overline{z}}{\hat{\psi}} \quad (21)$$

Note that to perform this estimation initially a minimum of two observations (z[1], z[2]) are required. Thus, the algorithm starts with n=3. The initial measurements n=1 and n=2 are performed with a slightly different value for α. During each iteration for n>2 the value of $\hat{\alpha}_0$ is calculated using Equations (19) to (21). Then, as a phase correction value for the next iteration the average value α[n+1]=½ ($\hat{\alpha}_0$ +α[n]) is used.

The steps performed at each iteration n are:
1. generate PN sequence, transmit, and calculate correlation value
2. estimate the phase correction value $\hat{\alpha}_0$
3. set phase correction value α[n+1]=½($\hat{\alpha}_0$ +α[n])

For both cases described above the performance of the algorithms increases with increasing number of iterations. Thus, a history of 5, 7 or 10 measurements (sliding window) or more may be used to calculate the estimates.

In another embodiment, the calibration unit may be configured to tune parameters of elements in the in-phase signal paths and the quadrature signal paths of the transceivers. In addition or as alternative, the calibration unit may be configured to perform a digital calibration of the in-phase signal paths and the quadrature signal paths of the transceivers by adapting the input signals to the transceivers accordingly and/or by adapting the output signals of the transceivers accordingly.

The calibration unit may perform any of the two possibilities or a combination of the two possibilities of tuning parameters of the elements in the transceiver, i.e. adapt the hardware, and performing digital calculations with signals that are provided to the transceiver or that are received from the transceiver.

If the calibration unit is to adapt parameters of the elements of the in-phase signal paths and the quadrature signal paths of the transceivers, the transceivers are required to comprise elements with a configuration interface. Such a configuration interface may be an analog interface, e.g. for tuning a phase shifter with a voltage or current, or may be a digital interface, e.g. for adapting DACs or ADCs or the like. It is understood, that additional or dedicated elements may be provided in the in-phase signal paths and the quadrature signal paths of the transceivers for tuning the amplitude and the phase of the respective signals.

In case that the IQ imbalance requires adapting the elements of the in-phase signal paths and the quadrature signal paths of the transceivers beyond their configuration limits, the calibration unit may in addition use a digital calibration that is performed on the IQ signals that are provided to or received from the transceivers.

It is understood, that a pure digital IQ imbalance calibration may also be used in systems, where the transceivers do not comprise any tunable elements.

In a further embodiment, the calibration system may serve for calibrating at least two transceivers, wherein the calibration transceiver may be embodied as one of the transceivers.

Using one of the transceivers as calibration transceiver is especially beneficial in TDD (Time Domain Duplex) systems, where either the receivers or the transmitters are active at any point in time. Therefore, for calibrating the receivers, the transmitter of one of the transceivers may be used. Accordingly, for calibrating the transmitters, the receiver of one of the transceivers may be used.

As explained above, the calibration transceiver should be free of IQ imbalances and must therefore be calibrated. However, if the calibration transceiver is one of the transceivers, it is difficult to calibrate the calibration transceiver without interrupting normal operation of e.g. an antenna that comprises the transceivers.

Therefore, the calibration system may comprise a calibration transceiver calibration unit, which may be integrated into the calibration unit in one embodiment. The calibration transceiver calibration unit may e.g. calibrate the calibration transceiver by calculating the IQ imbalances for all other transceivers and taking the average IQ imbalance as the IQ imbalance of the calibration transceiver.

As alternative, when not in use for operative communication in a TDD system, the transmitter or the receiver of the calibration transceiver may be separated from the respective antenna and may be calibrated e.g. using a single tone scheme.

As further alternative, the calibration transceiver may be periodically separated from the respective antenna or antenna element and may be calibrated with the single tone scheme. Especially in massive MIMO antennas with multiple transceivers the temporary loss of one of the transceivers and the corresponding temporary loss of signal quality may be small and acceptable. In one embodiment the calibration transceiver calibration unit may e.g. analyze the load situation of the antenna and only calibrate the calibration transceiver if it is not needed, e.g. the other transceivers are sufficient to operate the antenna in the respective load scenario with a predetermined performance.

BRIEF DESCRIPTION OF THE DRAWINGS

For a more complete understanding of the present invention and advantages thereof, reference is now made to the following description taken in conjunction with the accompanying drawings. The invention is explained in more detail below using exemplary embodiments which are specified in the schematic figures of the drawings, in which.

In the figures like reference signs denote like elements unless stated otherwise.

DETAILED DESCRIPTION OF THE DRAWINGS

Figure 1:
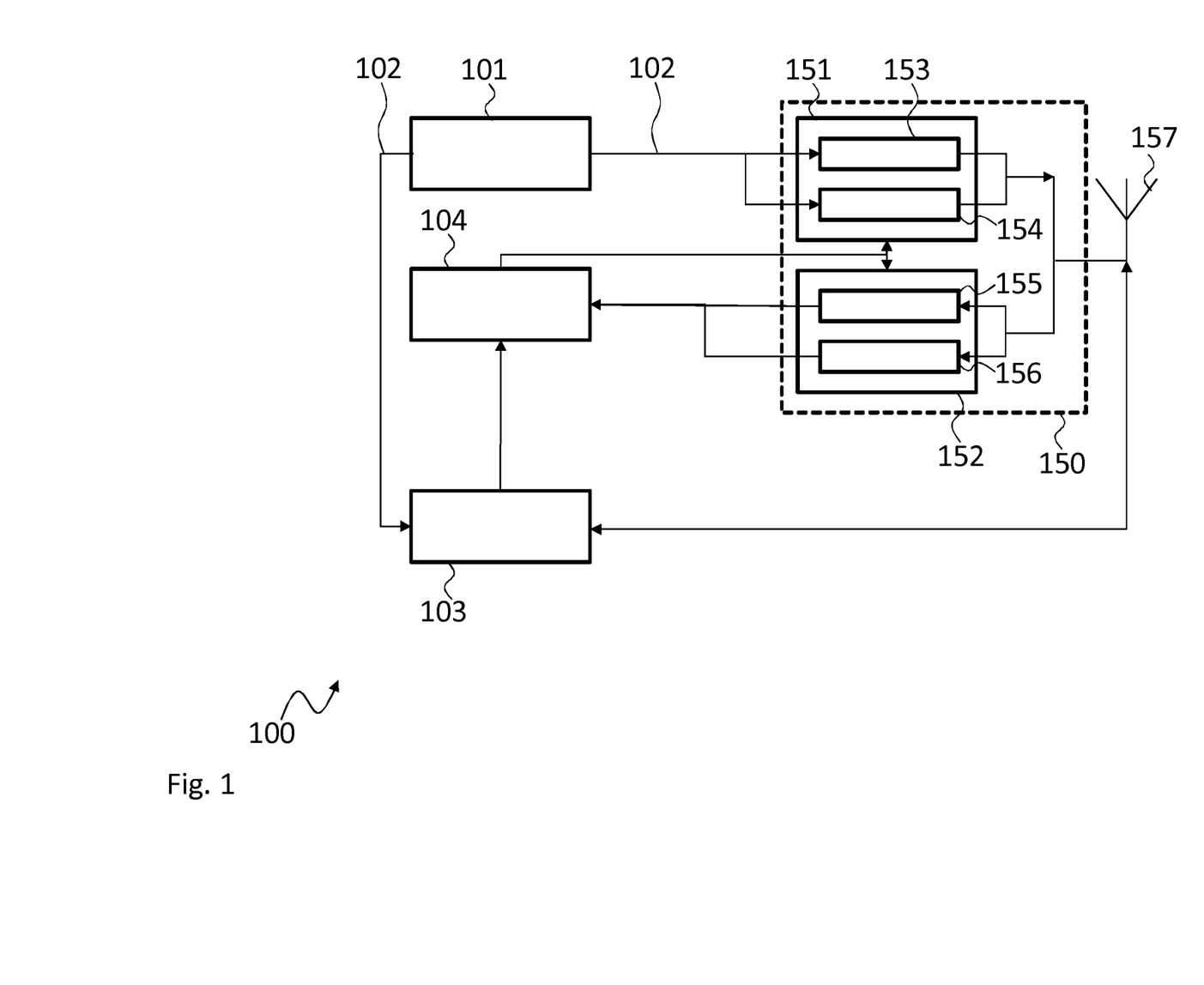
FIG. 1 shows a block diagram of an embodiment of a calibration system according to the present invention.

FIG. 1 shows a block diagram of a calibration system 100. The calibration system 100 serves for calibrating a number of transceivers 150, of which only one is shown for sake of simplicity. The transceiver 150 comprises a transmitter 151 with an in-phase signal path 153 and a quadrature signal path 154 in receive direction, and a receiver 152 with an in-phase signal path 155 and a quadrature signal path 156 in transmit direction. The transmitter 151 and the receiver 152 are both coupled to an antenna element 157.

The calibration system 100 comprises a calibration signal generator 101 that is coupled to the transceiver 150 and to a calibration transceiver 103. The calibration transceiver 103 and the receiver 152 are coupled to a calibration unit 104 on the input side. The calibration unit 104 is further coupled on its output side to the transmitter 151 and the receiver 152.

The calibration signal generator 101 generates a predefined calibration signal 102 for calibrating the transceiver 150. As can be seen, the calibration signal 102 may be provided to the transceiver 150, i.e. the transmitter 151, directly from the signal generator 101.

As alternative, the calibration signal 102 may be provided to the transceiver 150, i.e. the receiver 152, via the calibration transceiver 103. The calibration transceiver 103 in order to calibrate the receiver 152 may therefore supply the generated calibration signal 102 to the transceiver 150 during operation of the transceiver 150 in the form of RF signals that may then be coupled into the receiving signal path of the antenna element 157 and the transceiver 150. The receiver 152 will then supply IQ-signals, i.e. an I-signal and a Q-signal, to the calibration unit 104. It is understood, that also not shown the IQ-signals may also be provided to a baseband processor for further processing of the operational signals that are included in the output IQ-signals of the receiver 152.

In order to calibrate the transmitter 150, the signal generator 101 transmits the calibration signal 102 to the transmitter 151 that generates a respective RF signal. The calibration transceiver 103 will therefore receive the calibration signal 102 together with the operational signals from one of the transceivers 150 during operation of the transceiver 150. It is understood, that some kind of mixing of the IQ signals of the baseband processor and the calibration signal 102 may be performed, e.g. by adding the calibration signal 102 to the operational IQ signals, e.g. in the baseband processor or a dedicated adder.

The calibration unit 104 calibrates the in-phase signal paths 153, 155 and the quadrature signal paths 154, 156 of the transceiver 150 during operation of the transceiver 150 based on the calibration signals 102 after they traveled through the transmitter 151 or the receiver 152 of the transceiver 150.

It is understood, that although only one transceiver 150 is shown, the calibration system 100 may be used with any number of transceivers. The transceivers may then e.g. be calibrated sequentially at predetermined intervals.

Further, more than one calibration transceiver 103 may be provided in the calibration system 100. In this case more than one of the transceivers may be calibrated simultaneously. As alternative to using multiple calibration transceivers 103, orthogonal calibration signals 102 may be used, that because of their orthogonality may be separated in the receiver, i.e. the calibration transceiver 103.

Figure 2:
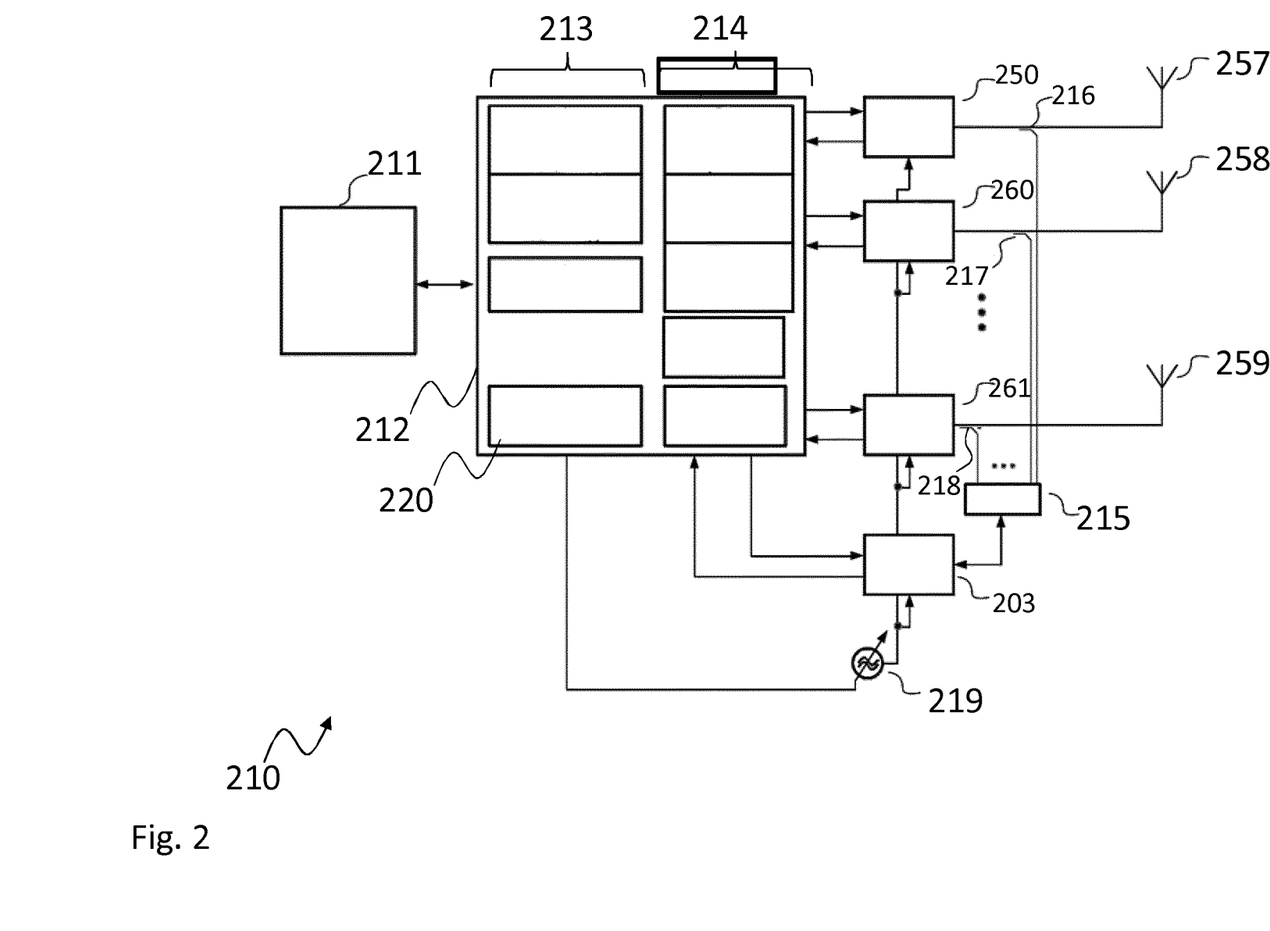
FIG. 2 shows a block diagram of an embodiment of an antenna system according to the present invention.

FIG. 2 shows a block diagram of an antenna system 210. The antenna system 210 comprises a baseband processor 211 that is coupled to a signal processing unit 212. The signal processing unit 212 is coupled to a plurality of transceivers 250, 260, 261. It is understood, that although three transceivers 250, 260, 261 are shown, any number of transceivers may be provided (indicated by three dots). The transceivers 250, 260, 261 are each further coupled to a respective antenna element 257, 258, 259 for transmitting and receiving RF signals.

The antenna system 210 further comprises a calibration transceiver 203 that is coupled via a switch 215 and coupling lines 216, 217, 218 to the signal paths between the antenna elements 257, 258, 259 and the transceivers 250, 260, 261. The calibration transceiver 203 is further coupled to the calibration blocks 214. Further, a local reference clock 219 is provided that is coupled to the calibration transceiver 203, the transceivers 250, 260, 261, and a clock synchronization unit 220 of the signal processing unit 212.

The signal processing unit 212 comprises beamforming blocks 213 and calibration blocks 214. The beamforming blocks 213 may e.g. comprise beamforming functions in transmit and in receive direction. The calibration blocks 213 may e.g. comprise at least part of the calibration unit of the present invention. In addition the calibration blocks 213 may comprise calibration functions that perform a calibration of the output level and phase between the different transceivers 250, 260, 261 (i.e. an inter-transceiver calibration—as opposed to the intra-transceiver calibration of the present invention)

In the antenna system 210 the calibration transceiver 203 may be sequentially coupled to the single transceivers 250, 260, 261 by controlling the switch 215 accordingly. The coupling lines 216, 217, 218 allow the calibration transceiver 203 to provide the calibration signal in RF form to the respective transceiver 250, 260, 261. Further, the calibration signal may be provided from the respective calibration blocks 214 in the signal processing unit 212 to the respective transceivers 250, 260, 261 as IQ signals. The calibration transceiver 203 may then receive RF signals, which include the calibration signals, from the respective transceiver 250, 260, 261.

The further signal processing and determination of the IQ imbalance of the respective transceivers 250, 260, 261 may then be performed in the signal processing unit 212, e.g. in respective calibration blocks 214.

It is understood, that the calibration transceiver 203 may be pre-calibrated prior to performing the calibration of the transceivers 250, 260, 261. The calibration transceiver 203 may e.g. be calibrated using a single tone calibration scheme, while it is not connected to any of the transceivers 250, 260, 261.

FIG. 2 shows an antenna system 210 that may e.g. be used in FDD and TDD systems. However, if the antenna system 210 is used in a TDD system, the antenna system 210 may either transmit RF signals or receive RF signals at any point in time. Therefore, either the transmitters or the receivers of the transceivers 250, 260, 261 will be unused at any point in time. It is therefore possible to use one of the transceivers 250, 260, 261 as calibration transceiver 203. If the antenna system 210 is transmitting RF signals, the receiver of the transceiver 250, 260, 261 that serves as calibration transceiver 203 may receive the calibration signals from the transceiver 250, 260, 261 that is to be calibrated, i.e. the respective transmitter. While the antenna system 210 is receiving RF signals, the transmitter of the transceiver 250, 260, 261 that serves as calibration transceiver 203 may provide the calibration signals as RF signals to the respective transceiver 250, 260, 261 that is to be calibrated, i.e. the respective receiver.

Figure 3:
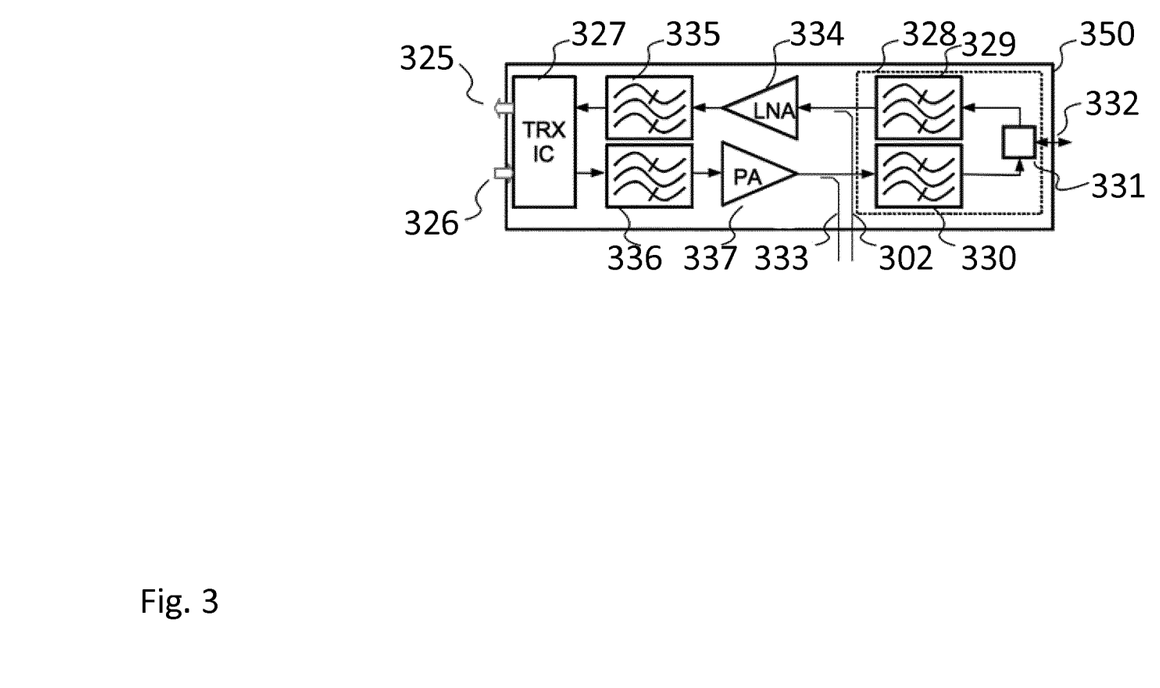
FIG. 3 shows a block diagram of an embodiment of a transceiver for use in an embodiment of an antenna system according to the present invention.

FIG. 3 shows a detailed block diagram of a transceiver 350 that may e.g. be used in the antenna system 210 of FIG. 2.

The transceiver 350 comprises a transceiver IC 327 that may receive an IQ-signal or provide an IQ-signal, e.g. to a baseband processor. The transceiver IC 327 is coupled to a duplexer 328 via a bandpass filter 335 and a low noise amplifier 334 in the receive signal path and via a bandpass filter 336 and a power amplifier 337 in the transmit path. The duplexer 328 comprises a RX duplex filter 329 in the receive path and a TC duplex filter 330 in the transmit path. The RX duplex filter 329 and the TC duplex filter 330 are both coupled to a diplexer 331 that provides a RF signal 332 or receives an RF signal 332.

The transceiver 350 further comprises coupling element 302 and coupling element 333. The coupling element 302 is coupled to the receive signal path between the duplexer 328 and the low noise amplifier 334. The coupling element 333 is coupled between the power amplifier 337 and the duplexer 328 in the transmit signal path. The coupling elements 302, 333 may be used as alternative to the arrangement of FIG. 2 to couple in signals into and couple out signals out of the transceiver IC 327.

Figure 4:
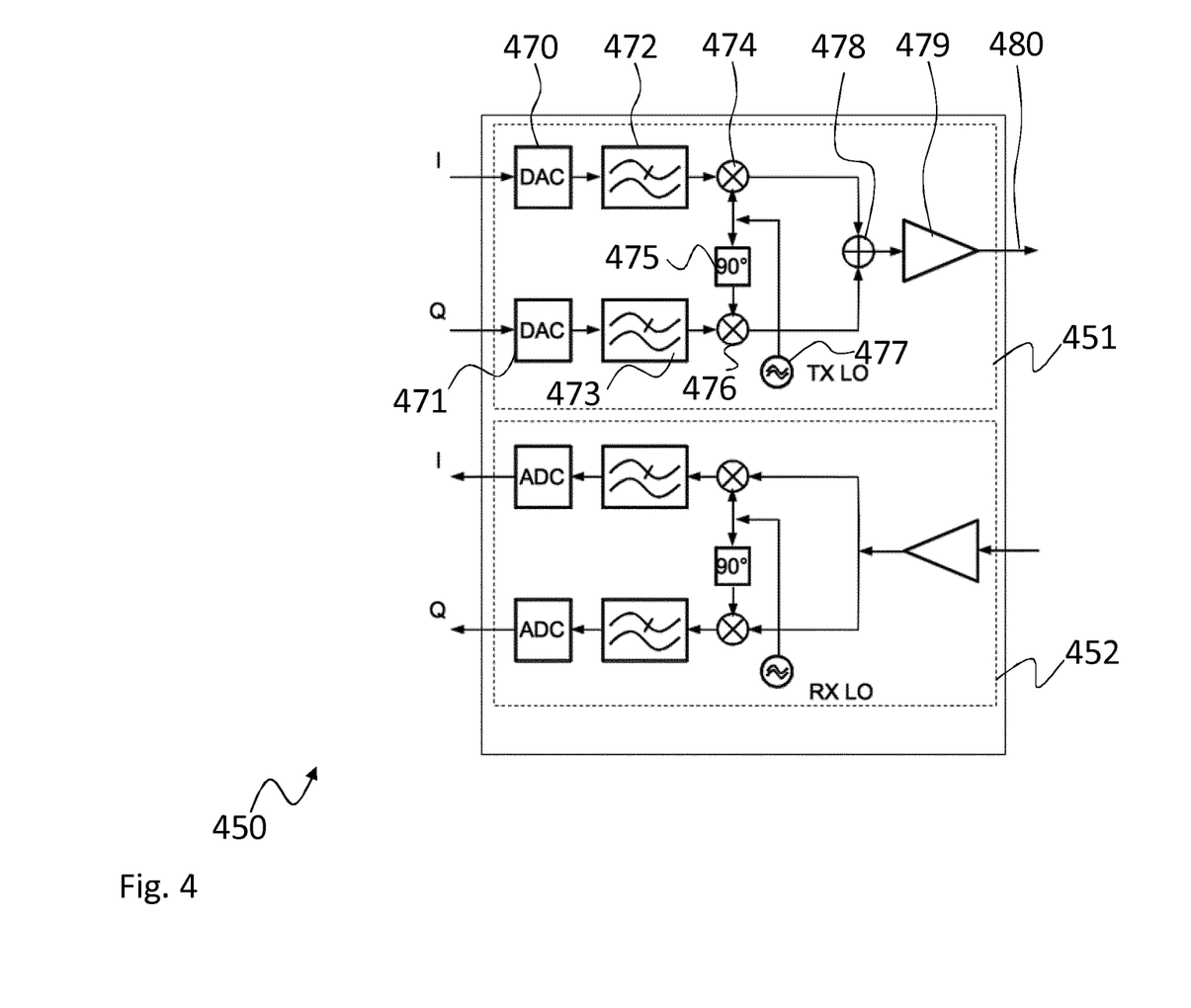
FIG. 4 shows a block diagram of another embodiment of a transceiver for use in an embodiment of an antenna system according to the present invention.

FIG. 4 shows a block diagram of another a transceiver 450. The transceiver 450 is a direct conversion transceiver 450 that comprises a transmitter 451 and a receiver 452. An exemplary arrangement is described in detail for the transmitter 451. The receiver 452 comprises analogous elements for receiving RF signals.

The transmitter 451 comprises a digital IQ interface comprising a DAC 470 for the I-signal and a DAC 471 for the Q-signal. A low pass filter 472 is coupled to the DAC 470 and a low pass filter 473 is coupled to the DAC 471. A local oscillator 477 provides a sinusoidal waveform that is mixed by mixer 474 with the output of low pass filter 472. The sinusoidal waveform is further phase-shifted by phase-shifter 475 by 900 and mixed by mixer 476 with the output of low pass filter 473. The output signals of mixer 474 and mixer 476 are added together by adder 478. The output of adder 478 is amplifier by amplifier 479 and output as RF signal 480.

In the arrangement of the transmitter 451 a plurality of elements may comprise tolerances. For example DACs 470, 471, low pass filters 472, 473 and mixers 474 may comprise amplitude tolerances. Further, the phase-shifter 475 may shift the incoming signal by more or less than exactly 90°.

Therefore, these elements may be the source of IQ-imbalances in the transmitter 451.

The receiver 452 comprises a similar arrangement. The adder 478 is removed and instead of DACs 470, 471 there are ADCs provided. However, these ADCs may comprise similar tolerances as the DACs 470, 471.

Therefore, these elements may be the source of IQ-imbalances in the transmitter 452.

Figure 5:
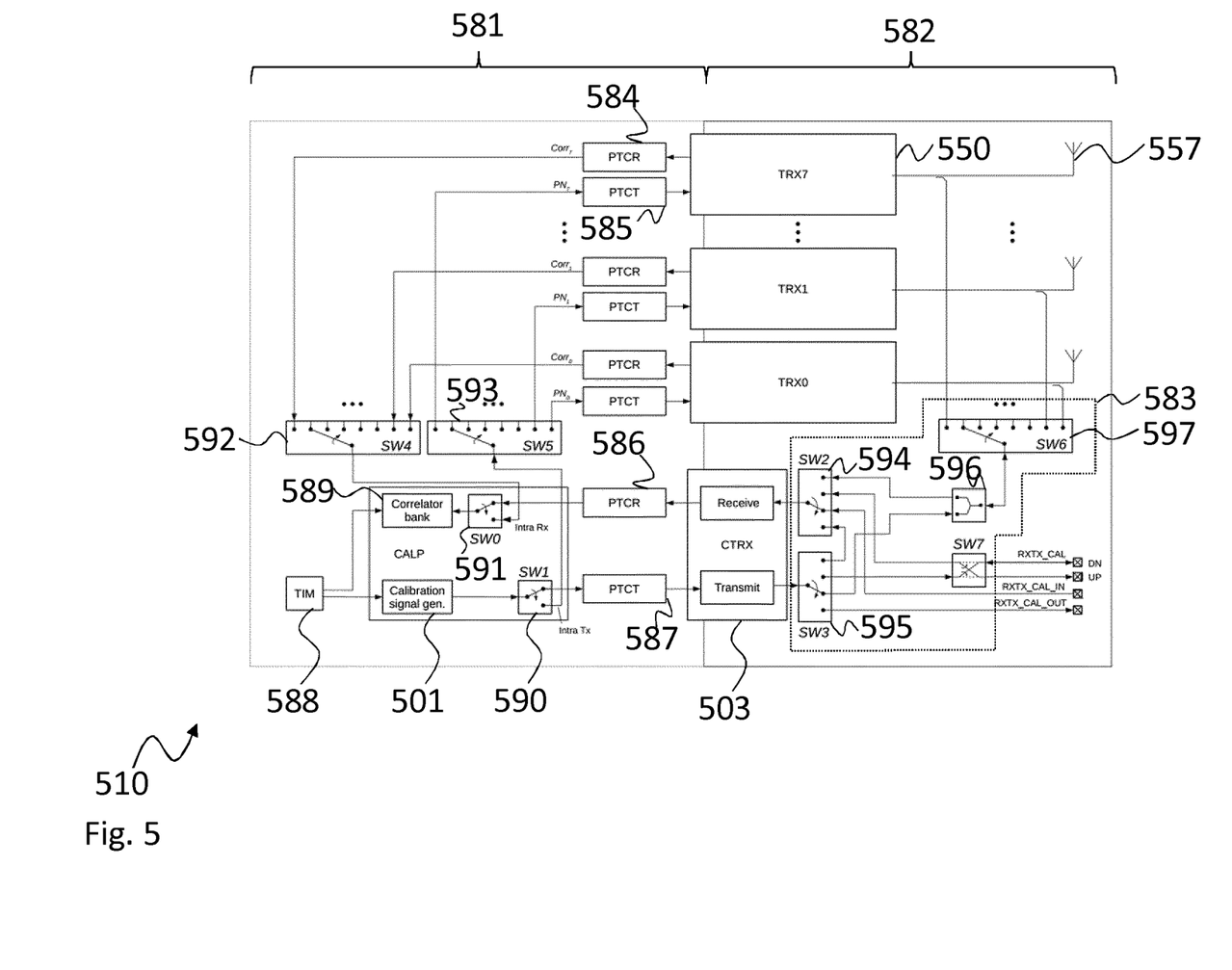
FIG. 5 shows a block diagram of another embodiment of an antenna system according to the present invention.

FIG. 5 shows a block diagram of an antenna system 510. The antenna system 510 comprises a digital domain 581 and an analog domain 582. Bridging the digital domain 581 and the analog domain 582 three transceivers are shown, wherein only the first transceiver 550 is provided with a reference sign. It is understood, that any number of transceivers may be provided. In the following only the signal chain for transceiver 550 will be explained in detail. It is understood, that the signal chains of the other transceivers may be provided analogously. It is further understood, that only the signal chain corresponding to the calibration of the transceiver 550 is provided with reference signs. The signal chain for processing operational signals is omitted for sake of clarity.

The digital output of transceiver 550 is coupled to a receive phase & time correction module 584. The digital input of transceiver 550 is coupled to a transmit phase & time correction module 585. The receive phase & time correction module 584 is coupled via a selection switch 592 and a direction switch 591 to a correlator bank 589. The transmit phase & time correction module 585 is coupled via direction switch 590 and selection switch 593 to the calibration signal generator 501. Further, a calibration transceiver 503 is provided. The digital output of calibration transceiver 503 is coupled via a receive phase & time correction module 586 to direction switch 591. The digital input of the transceiver 550 is coupled via transmit phase & time correction module 587 to the direction switch 590.

The direction switches 590, 591 serve to select the direction of the calibration. They may be used to select if the calibration signal is transmitted to the transceiver 550 and received via calibration transceiver 503, or if the calibration signal is transmitted to calibration transceiver 503 and received via transceiver 550.

A switching matrix 583 is further provided on the RF interface of the calibration transceiver 503. The switching matrix 583 comprises five different switches that allow coupling the RF interface of the calibration transceiver 503 to transmitter 550 either in receive or transmit direction and that further allow coupling the calibration transceiver 503 Bitte geben Sie hier an, womit der calibration transceiver 503 noch gekoppelt wird (Signals: RXTX_CAL etc.).

For sake of clarity in the following description of the method based FIG. 6 the reference signs used above in the description of apparatus based FIGS. 1-5 will be maintained.

Figure 6:
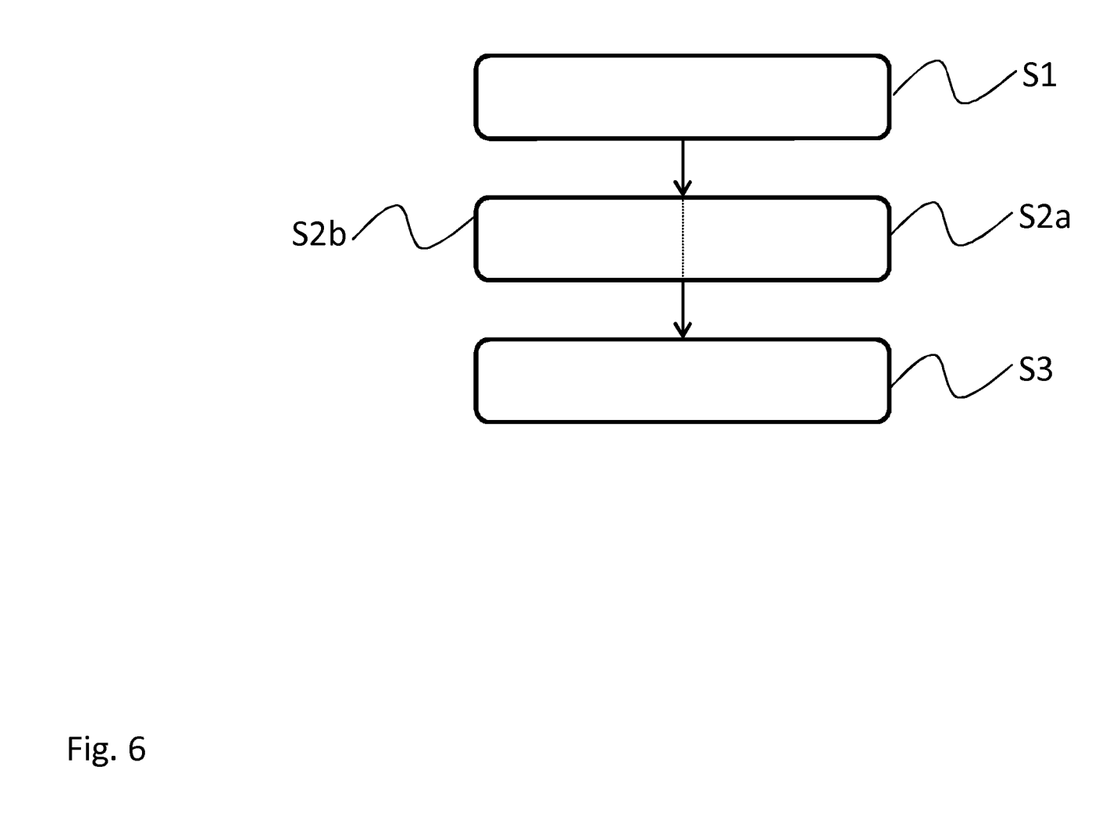
FIG. 6 shows a flow diagram of an embodiment of a calibration method according to the present invention.

FIG. 6 shows a flow diagram of a calibration method for calibrating a number of transceivers 150, 250, 260, 261, 350, 450, 550, each comprising an in-phase signal path 153, 155 and a quadrature signal path 154, 156 in receive direction and/or in transmit direction.

The calibration method comprises generating S1 a predefined calibration signal 102, 302, 333 for every one of the transceivers 150, 250, 260, 261, 350, 450, 550.

Further, the calibration method comprises supplying S2a the generated calibration signals 102, 302, 333 each to the respective transceiver 150, 250, 260, 261, 350, 450, 550 during operation of the transceivers 150, 250, 260, 261, 350, 450, 550 via a calibration transceiver 103, 203, 503, or receiving S2b the predefined calibration signals 102, 302, 333 each from the respective one of the transceivers 150, 250, 260, 261, 350, 450, 550 during operation of the transceivers 150, 250, 260, 261, 350, 450, 550 in the calibration transceiver 103, 203, 503.

The method also comprises calibrating S3 the in-phase signal paths 153, 155 and the quadrature signal paths 154, 156 of the transceivers 150, 250, 260, 261, 350, 450, 550 during operation of the transceivers 150, 250, 260, 261, 350, 450, 550 based on the calibration signals 102, 302, 333 as they are received by the transceivers 150, 250, 260, 261, 350, 450, 550 or based on the calibration signals 102, 302, 333 as they are received by the calibration transceiver 103, 203, 503.

Supplying S2a or receiving S2b may comprise coupling in a signal into the respective transceiver 150, 250, 260, 261, 350, 450, 550 and/or coupling out a signal out of the respective transceiver 150, 250, 260, 261, 350, 450, 550 via a coupling element. To this end, bidirectional or unidirectional coupling elements may be provided.

Each one of the calibration signals 102, 302, 333 may for example comprises two orthogonal signals or two quasi-orthogonal signals. Each one of the calibration signals 102, 302, 333 may especially comprise two pseudo noise signals, especially band-limited pseudo noise signals, and more especially modulated pseudo-random binary sequences. Such signals may be emitted concurrently and may still be separated and processed separately at the receiver side.

The calibration signals 102, 302, 333 may further comprise equal autocorrelation and zero cross-correlation.

The calibration method may comprise correlating signals received by a specific one of the transceivers 150, 250, 260, 261, 350, 450, 550 with the respective predetermined calibration signal 102, 302, 333 and/or correlating signals received by the calibration transceiver 103, 203, 503 with the respective predetermined calibration signal 102, 302, 333, wherein calibrating the respective in-phase signal paths 153, 155 and the quadrature signal paths 154, 156 of the transceivers 150, 250, 260, 261, 350, 450, 550 is performed based on the correlation result. In addition, the calibration method may comprise determining the imbalances between the in-phase signal path 153, 155 and the quadrature signal path 154, 156 in receive direction and/or in transmit direction of a respective transceiver 150, 250, 260, 261, 350, 450, 550 based on a least square regression algorithm.

In order to perform the required calibration the step of calibrating S3 may comprise tuning parameters of elements in the in-phase signal paths 153, 155 and the quadrature signal paths 154, 156 of the transceivers 150, 250, 260, 261, 350, 450, 550. In addition or as alternative the step of calibrating S3 may comprise performing a digital calibration of the in-phase signal paths 153, 155 and the quadrature signal paths 154, 156 of the transceivers 150, 250, 260, 261, 350, 450, 550 by adapting the input signals to the transceivers 150, 250, 260, 261, 350, 450, 550 accordingly and/or by adapting the output signals of the transceivers 150, 250, 260, 261, 350, 450, 550 accordingly.

It is understood, that the calibration method may be used for calibrating at least two transceivers 150, 250, 260, 261, 350, 450, 550. In this case, supplying S2a and receiving S2b may be performed with one of the transceivers 150, 250, 260, 261, 350, 450, 550.

Although specific embodiments have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

The present invention provides a calibration system 100 for calibrating a number of transceivers 150, 250, 260, 261, 350, 450, 550, each comprising an in-phase signal path 153, 155 and a quadrature signal path 154, 156 in receive direction and/or in transmit direction, the calibration system 100 comprising a calibration signal generator 101, 501 that is configured to generate a predefined calibration signal 102, 302, 333 for every one of the transceivers 150, 250, 260, 261, 350, 450, 550, a calibration transceiver 103, 203, 503 that is coupled to the calibration signal generator 101, 501 and to the transceivers 150, 250, 260, 261, 350, 450, 550 and that is configured supply the generated calibration signals 102, 302, 333 each to the respective transceiver 150, 250, 260, 261, 350, 450, 550 during operation of the transceivers 150, 250, 260, 261, 350, 450, 550, and/or that is configured to receive the predefined calibration signals 102, 302, 333 each from one of the transceivers 150, 250, 260, 261, 350, 450, 550 during operation of the transceivers 150, 250, 260, 261, 350, 450, 550, and a calibration unit 104 that is configured to calibrate the in-phase signal paths 153, 155 and the quadrature signal paths 154, 156 of the transceivers 150, 250, 260, 261, 350, 450, 550 during operation of the transceivers 150, 250, 260, 261, 350, 450, 550 based on the calibration signals 102, 302, 333 as they are received by the transceivers 150, 250, 260, 261, 350, 450, 550 or based on the calibration signals 102, 302, 333 as they are received by the calibration transceiver 103, 203, 503. Further, the present invention provides an antenna system 210, 510 and a calibration method.

LIST OF REFERENCE SIGNS 100 calibration system
101, 501 calibration signal generator
102, 302, 333 calibration signal
103, 203, 503 calibration transceiver
104 calibration unit
150, 250, 260, 261, 350, 450, 550 transceiver
151, 451 transmitter
152, 452 receiver
153, 155 in-phase signal path
154, 156 quadrature signal path
157, 257, 258, 259, 557 antenna element
210, 510 antenna system
211 baseband processor
212 signal processing unit
213 beamforming blocks
214 calibration blocks
215 switch
216, 217, 218 coupling element
219 local reference clock
220 clock synchronization
325 output signals
326 input signals
327 transceiver IC
328 duplexer
329 RX duplex filter
330 TX duplex filter
331 diplexer
332 RF signal
334 low noise amplifier
335, 336 band pass filter
337 power amplifier
470, 471 DAC
472, 473 low pass filter
474, 476 mixer
475 phase shifter
477 local oscillator
478 adder
479 amplifier
480 RF signal
581 digital domain
582 analog domain
583 switching matrix
584, 586 receive phase & time correction module
585, 587 transmit phase & time correction module
588 timer
589 correlator
590, 591, 592, 593 switch
S1, S2a, S2b, S3 method steps

The invention claimed is:

1. A calibration system for calibrating a number of transceivers, each comprising an in-phase signal path and a quadrature signal path in receive direction and/or in transmit direction, the calibration system comprising:
- a calibration signal generator that is configured to generate a predefined calibration signal for every one of the transceivers,
- a calibration transceiver that is coupled to the calibration signal generator and to the transceivers and that is configured to supply the generated predefined calibration signals each to the respective transceiver during operation of the transceivers and/or that is configured to receive the predefined calibration signals after they travel through each one of the transceivers during operation of the transceivers, and
- a calibration unit that is configured to calibrate the in-phase signal paths and the quadrature signal paths of the transceivers during operation of the transceivers based on the calibration signals as they are received by the transceivers or based on the calibration signals as they are received by the calibration transceiver.

2. The calibration system according to claim 1, wherein each calibration signal comprises two orthogonal signals or two quasi-orthogonal signals.

3. The calibration system according to claim 1, wherein each calibration signal comprises two pseudo noise signals, especially band-limited pseudo noise signals, and more especially modulated pseudo-random binary sequences.

4. The calibration system according to claim 3, wherein the calibration signals comprise equal autocorrelation and zero cross-correlation.

5. The calibration system according to any claim 1, comprising a coupling element for every transceiver configured to couple in a signal into the respective transceiver and/or couple out a signal out of the respective transceiver.

6. The calibration system according to claim 1, wherein the calibration unit comprises a number of correlators that are each configured to correlate signals received by a specific one of the transceivers with the respective predefined calibration signal and/or that are each configured to correlate signals received by the calibration transceiver with the respective predefined calibration signal, wherein the calibration unit is configured to calibrate the respective in-phase signal paths and the quadrature signal paths of the transceivers based on the correlation result.

7. The calibration system according to claim 6, wherein the calibration unit is configured to determine imbalances between the in-phase signal path and the quadrature signal path in receive direction and/or in transmit direction of a respective transceiver based on a least square regression algorithm.

8. The calibration system according to claim 7, wherein the calibration unit is configured to tune parameters of elements in the in-phase signal paths and the quadrature signal paths of the transceivers; and/or wherein the calibration unit is configured to perform a digital calibration of the in-phase signal paths and the quadrature signal paths of the transceivers by adapting input signals to the transceivers accordingly and/or by adapting output signals of the transceivers accordingly.

9. The calibration system according to claim 6, wherein the calibration unit is configured to tune parameters of elements in the in-phase signal paths and the quadrature signal paths of the transceivers; and/or wherein the calibration unit is configured to perform a digital calibration of the in-phase signal paths and the quadrature signal paths of the transceivers by adapting input signals to the transceivers accordingly and/or by adapting output signals of the transceivers accordingly.

10. A calibration system according to claim 1 for calibrating at least two transceivers, wherein the calibration transceiver is embodied as one of the transceivers.

11. An antenna system comprising:
- a plurality of antenna elements,
- a transceiver for every one of the antenna elements that is coupled to the respective antenna element, and
- a calibration system according to claim 1.

12. The calibration system claim 11, wherein the calibration unit comprises a number of correlators that are each configured to correlate signals received by a specific one of the transceivers with the respective predefined calibration signal and/or that are each configured to correlate signals received by the calibration transceiver with the respective predefined calibration signal, wherein the calibration unit is configured to calibrate the respective in-phase signal paths and the quadrature signal paths of the transceivers based on the correlation result.

13. The calibration system according to claim 12, wherein the calibration unit is configured to determine imbalances between the in-phase signal path and the quadrature signal path in receive direction and/or in transmit direction of a respective transceiver based on a least square regression algorithm.

14. The calibration system according to claim 13, wherein the calibration unit is configured to tune parameters of elements in the in-phase signal paths and the quadrature signal paths of the transceivers; and/or wherein the calibration unit is configured to perform a digital calibration of the in-phase signal paths and the quadrature signal paths of the transceivers by adapting input signals to the transceivers accordingly and/or by adapting output signals of the transceivers accordingly.

15. A calibration method for calibrating a number of transceivers, each comprising an in-phase signal path and a quadrature signal path in receive direction and/or in transmit direction, the calibration method comprising:
- generating a predefined calibration signal for every one of the transceivers,
- supplying the generated predefined calibration signals each to the respective transceiver during operation of the transceivers via a calibration transceiver or receiving the predefined calibration signals after they travel through the respective one of the transceivers during operation of the transceivers in the calibration transceiver, and
- calibrating the in-phase signal paths and the quadrature signal paths of the transceivers during operation of the transceivers based on the calibration signals as they are received by the transceivers or based on the calibration signals as they are received by the calibration transceiver.

16. The calibration method according to claim 15, wherein each calibration signal comprises two orthogonal signals or two quasi-orthogonal signals, and especially wherein each calibration signal comprises two pseudo noise signals, especially band-limited pseudo noise signals, and more especially modulated pseudo-random binary sequences; and/or wherein the calibration signals comprise equal autocorrelation and zero cross-correlation.

17. The calibration method according to claim 15, wherein supplying or receiving comprises coupling in a signal into the respective transceiver and/or coupling out a signal out of the respective transceiver via a coupling element.

18. The calibration method according to claim 15, comprising correlating signals received by a specific one of the transceivers with the respective predefined calibration signal and/or correlating signals received by the calibration transceiver with the respective predefined calibration signal, wherein calibrating the respective in-phase signal paths and the quadrature signal paths of the transceivers is performed based on the correlation result, and comprising determining imbalances between the in-phase signal path and the quadrature signal path in receive direction and/or in transmit direction of a respective transceiver based on a least square regression algorithm.

19. The calibration method according to claim 18, wherein calibrating comprises tuning parameters of elements in the in-phase signal paths and the quadrature signal paths of the transceivers; and/or wherein calibrating comprises performing a digital calibration of the in-phase signal paths and the quadrature signal paths of the transceivers by adapting input signals to the transceivers accordingly and/or by adapting output signals of the transceivers accordingly.

20. Calibration The calibration method according to claim 15 for calibrating at least two transceivers, wherein supplying and receiving is performed with one of the transceivers.

\* \* \* \* \*

UNITED STATES PATENT AND TRADEMARK OFFICE
CERTIFICATE OF CORRECTION

PATENT NO. : 11,218,230 B2
APPLICATION NO. : 17/252686
DATED : January 4, 2022
INVENTOR(S) : Michael Grieger et al.

It is certified that error appears in the above-identified patent and that said Letters Patent is hereby corrected as shown below:

In the Specification

Column 8, Line 36, Delete "x[n]=x[n]+jx[Q]." and insert -- x[n]=xI[n]+jx[Q]. --, therefor.

Column 8, Line 36, Delete "x[n]" and insert -- xI[n] --, therefor.

Column 9, Line 1, Delete "X$_i$[n]" and insert -- X$_I$[n] --, therefor.

Column 10, Line 55, Delete "α $\widetilde{a_0}$" and insert -- $\widetilde{a_0}$ --, therefor.

Column 15, Line 30, Delete "900" and insert -- 90° --, therefor.

Column 16, Line 20-23, Delete "direction and ..................CAL etc.)." and insert -- direction. --, therefor.

In the Claims

Column 19, Line 10, In Claim 1, delete "transceivers" and insert -- transceivers, --, therefor.

Column 19, Line 30, In Claim 5, after "according to" delete "any".

Column 21, Line 21, In Claim 20, delete "Calibration The" insert -- The --, therefor.

Signed and Sealed this
Tenth Day of May, 2022

*Katherine Kelly Vidal*
Katherine Kelly Vidal
*Director of the United States Patent and Trademark Office*